United States Patent
Gilland et al.

(10) Patent No.: US 9,385,356 B2
(45) Date of Patent: Jul. 5, 2016

(54) TERMINAL HOLDER FOR ELECTRIC VEHICLE BATTERY ASSEMBLY

(71) Applicant: FORD GLOBAL TECHNOLOGIES, LLC, Dearborn, MI (US)

(72) Inventors: Ronald D Gilland, Allen Park, MI (US); Adam Denlinger, Saline, MI (US); Tom M Gunther, Canton, MI (US); Rajaram Subramanian, Ann Arbor, MI (US); Edward Popyk, Dearborn, MI (US)

(73) Assignee: FORD GLOBAL TECHNOLOGIES, LLC., Dearborn, MI (US)

( * ) Notice: Subject to any disclaimer, the term of this patent is extended or adjusted under 35 U.S.C. 154(b) by 150 days.

(21) Appl. No.: 14/265,650

(22) Filed: Apr. 30, 2014

(65) Prior Publication Data
US 2015/0318524 A1    Nov. 5, 2015

(51) Int. Cl.
*H01M 2/10* (2006.01)
*H01M 2/30* (2006.01)
*B60L 11/18* (2006.01)
*H01M 2/20* (2006.01)

(52) U.S. Cl.
CPC ......... *H01M 2/1083* (2013.01); *B60L 11/1879* (2013.01); *H01M 2/1077* (2013.01); *H01M 2/206* (2013.01); *H01M 2/30* (2013.01); *H01M 2/305* (2013.01); *H01M 2220/20* (2013.01); *Y10S 903/907* (2013.01)

(58) Field of Classification Search
CPC ... H01M 2/1063; H01M 2/30; H01M 2/1077; H01M 2/206; H01M 2/305; B60L 11/1879
USPC .......................................................... 429/100
See application file for complete search history.

(56) References Cited

U.S. PATENT DOCUMENTS

| | | | |
|---|---|---|---|
| 6,432,575 B1 | 8/2002 | Yamagami | |
| 6,492,058 B1* | 12/2002 | Watanabe | H01M 2/1061 429/121 |
| 8,647,766 B2 | 2/2014 | Maguire | |
| 2010/0190050 A1* | 7/2010 | Ochi | H01M 2/24 429/160 |
| 2013/0012079 A1 | 1/2013 | Sakae et al. | |
| 2013/0143097 A1 | 6/2013 | Huang et al. | |
| 2013/0273412 A1 | 10/2013 | Okada et al. | |

OTHER PUBLICATIONS

Garrett P. Beauregard, "Report of Investigation: Hybrids Plus Plug in Hybrid Electric Vehicle", Jun. 26, 2008.

* cited by examiner

*Primary Examiner* — Karie O'Neill Apicella
(74) *Attorney, Agent, or Firm* — Carlson, Gaskey & Olds, P.C.

(57) ABSTRACT

An electric vehicle battery assembly according to an exemplary aspect of the present disclosure includes, among other things, a battery cell, a rail securing the cell, and a terminal holder in direct contact with the rail.

23 Claims, 3 Drawing Sheets

TERMINAL HOLDER FOR ELECTRIC VEHICLE BATTERY ASSEMBLY

BACKGROUND

Generally, electric vehicles differ from conventional motor vehicles in that electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), and battery electric vehicles (BEVs). Electric vehicles are typically equipped with a battery pack containing multiple battery cells that store electrical power for powering the electric machine. The battery cells may be charged prior to use, and recharged during drive by regeneration braking or an internal combustion engine.

The battery cells are typically retained in place by a plurality of rails, including upper rails and side rails. In one known arrangement, a dedicated rail cover electrically insulates the cells from the rails.

SUMMARY

An electric vehicle battery assembly according to an exemplary aspect of the present disclosure includes, among other things, a battery cell, a rail securing the cell, and a terminal holder in direct contact with the rail.

In a further non-limiting embodiment of the foregoing battery assembly, the rail is a side rail adjacent a side of the cell, and the terminal holder includes a side rail protection portion overhanging the side of the cell.

In a further non-limiting embodiment of the foregoing battery assembly, the side rail protection portion includes a flange extending downward from a lower surface of a main body portion of the terminal holder, and the flange of the side rail protection portion directly contacts the side of the cell and the side rail.

In a further non-limiting embodiment of the foregoing battery assembly, the flange of the side rail protection portion has a thickness of at least 1.6 mm.

In a further non-limiting embodiment of the foregoing battery assembly, the rail is an upper rail adjacent an upper surface of the cell, and the terminal holder includes an upper rail protection portion provided by a flange extending upward from an upper surface of a main body portion of the terminal. Further, the upper rail directly contacts the flange of the upper rail protection portion.

In a further non-limiting embodiment of the foregoing battery assembly, the flange of the upper rail protection portion includes a first leg, a second leg, and a third leg.

In a further non-limiting embodiment of the foregoing battery assembly, the assembly further includes a terminal in contact with the upper surface of the main body portion of the terminal holder. Further, the flange of the upper rail protection portion extends a height of at least 1.6 mm above an upper surface of the terminal.

In a further non-limiting embodiment of the foregoing battery assembly, the main body portion has a height of at least 1.6 mm.

In a further non-limiting embodiment of the foregoing battery assembly, the terminal holder is integrally formed of a dielectric material.

A terminal holder for an electric vehicle battery assembly according to another exemplary aspect of this disclosure includes, among other things, a main body portion having an upper surface and a lower surface, and a side rail protection portion including a flange extending downward from the lower surface of the main body portion.

In a further non-limiting embodiment of the foregoing terminal holder, the flange of the side rail protection portion has a thickness of at least 1.6 mm.

In a further non-limiting embodiment of the foregoing terminal holder, the terminal holder further includes an upper rail protection portion including a flange extending upward from the upper surface of the main body portion.

In a further non-limiting embodiment of the foregoing terminal holder, the flange of the upper rail protection portion includes a first leg, a second leg, and a third leg.

In a further non-limiting embodiment of the foregoing terminal holder, the main body portion, the side rail protection portion, and the upper rail protection portion are integrally formed.

In a further non-limiting embodiment of the foregoing terminal holder, the terminal holder is made of a dielectric material.

In a further non-limiting embodiment of the foregoing terminal holder, the main body portion has a height of at least 1.6 mm.

An electric vehicle battery assembly according to an exemplary aspect of the present disclosure includes, among other things, a battery cell, a side rail adjacent a side of the cell, an upper rail adjacent an upper surface of the cell, a terminal, and a terminal holder, The terminal holder includes a main body portion in contact with the terminal. The terminal holder further includes a side rail protection portion overhanging the side of the cell and directly contacting the side rail. Additionally, the terminal holder includes an upper rail protection portion extending upward from the main body portion and directly contacting the upper rail.

In a further non-limiting embodiment of the foregoing battery assembly, the side rail protection portion includes a flange extending downward from a lower surface of the main body portion.

In a further non-limiting embodiment of the foregoing battery assembly, the upper rail protection portion includes a flange having a first leg, a second leg, and a third leg.

In a further non-limiting embodiment of the foregoing battery assembly, an outer surface of the second leg directly contacts the side rail, and wherein an upper surface of the second leg directly contacts the upper rail.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
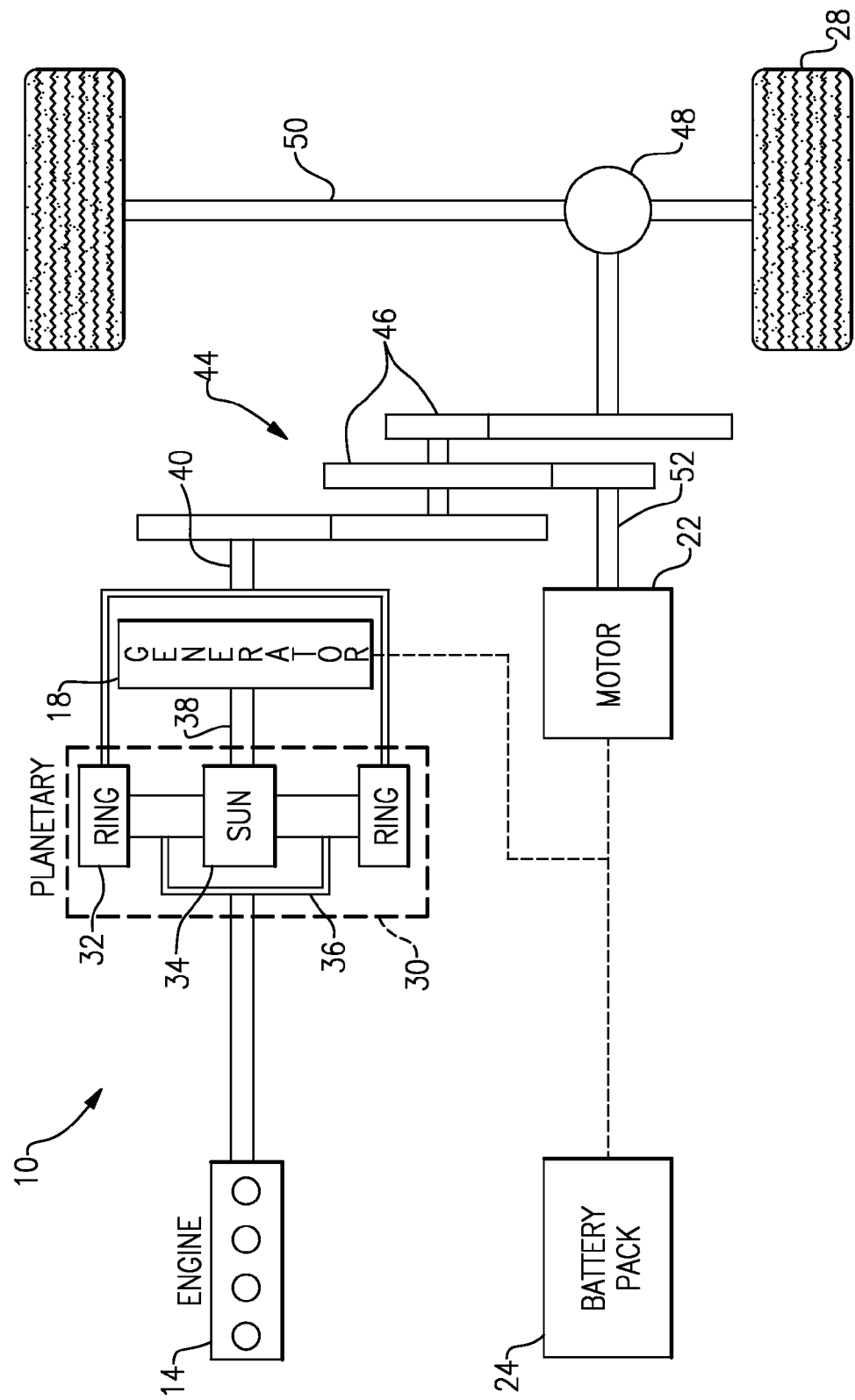
FIG. 1 is a schematic view of an example electric vehicle powertrain.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including but not limited to, plug-in hybrid electric vehicles (PHEVs), and battery electric vehicles (BEVs).

In one embodiment, the powertrain 10 is a powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 may be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque.

The battery pack 24 is an example type of electric vehicle battery assembly. The battery pack 24 may be a high voltage battery that is capable of outputting electrical power to operate the motor 22 and the generator 18. Other types of energy storage devices and/or output devices can also be used with the electric vehicle.

Figure 2:
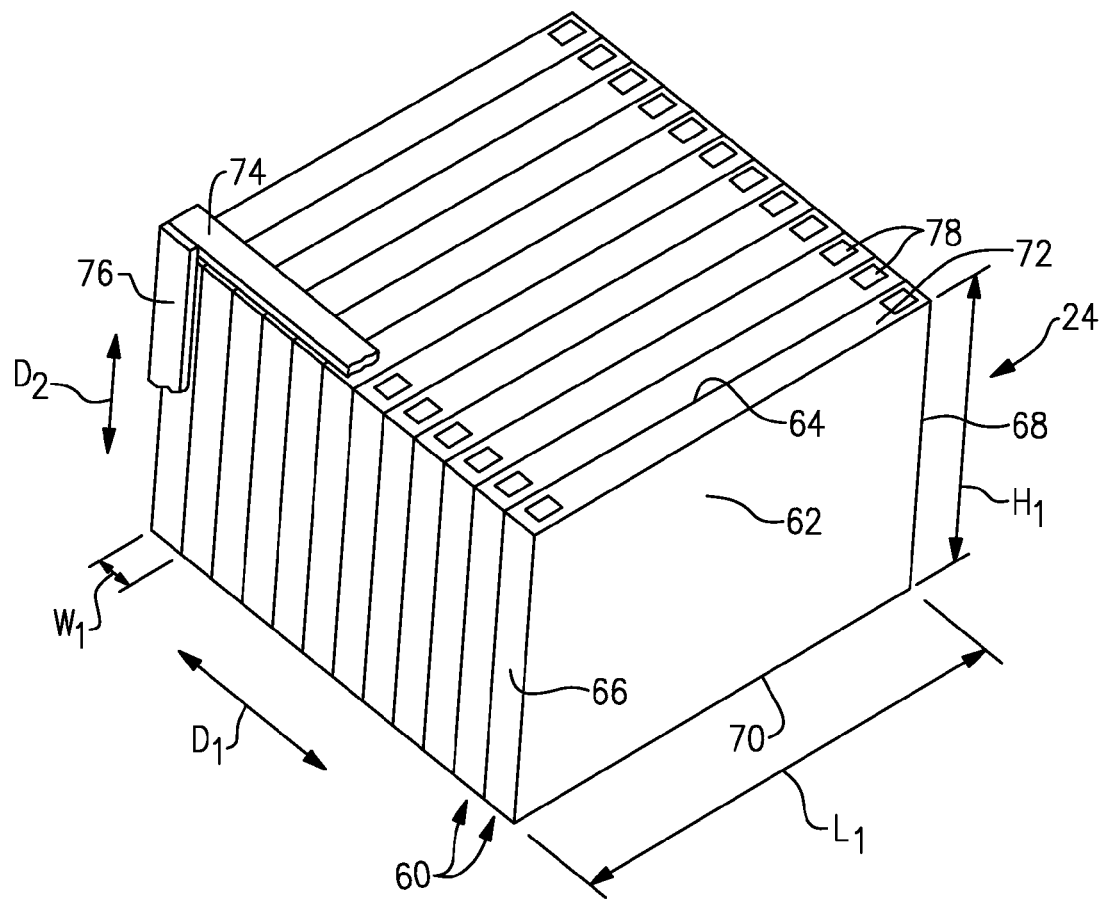
FIG. 2 is a schematic, perspective view of an example battery pack.

Referring to FIG. 2, an example of the battery pack 24 includes a plurality of battery cells 60. In this example, the cells 60 are prismatic cells. Each cell 60 include a first face 62 and a second face 64 opposite the first face 62. The faces 62, 64 each have a length $L_1$ and the height $H_1$. The cells 60 further include opposed sides 66, 68 having a width $W_1$ and a height $H_1$. The cells 60 also include lower and upper surfaces 70, 72, having the length $L_1$ and the width $W_1$.

The cells 60 are held in place (i.e., secured), in this example, by a number of rails. As illustrated in FIG. 2, an upper rail 74 extends in a first direction $D_1$. In this example, the first direction $D_1$ is parallel to the width $W_1$ of the cells 60 and is adjacent the upper surface 72 of the cells 60. While only one upper rail 74 is illustrated, it should be understood that additional upper rails may be included.

Further, a side rail 76 extends along the sides of the cells 60 in a second direction $D_2$. $D_2$, in this example, is parallel to the height $H_1$ of the cells 60. While only one side rail 76 is illustrated, there may be additional side rails. For instance, there may be one side rail 76 adjacent each side 66, 68 of each cell 60.

The upper and side rails 74, 76 are made of a metallic material in some examples. Although not shown in FIG. 2, there may also be lower rail may support the cells 60 from below.

The cells 60 each include a current collector 78. In this example, each cell 60 includes two current collectors 78—one on each laterally outer side of the upper surface 72. Current moves to and from the cells 60 through the current collector 78.

Figure 3:
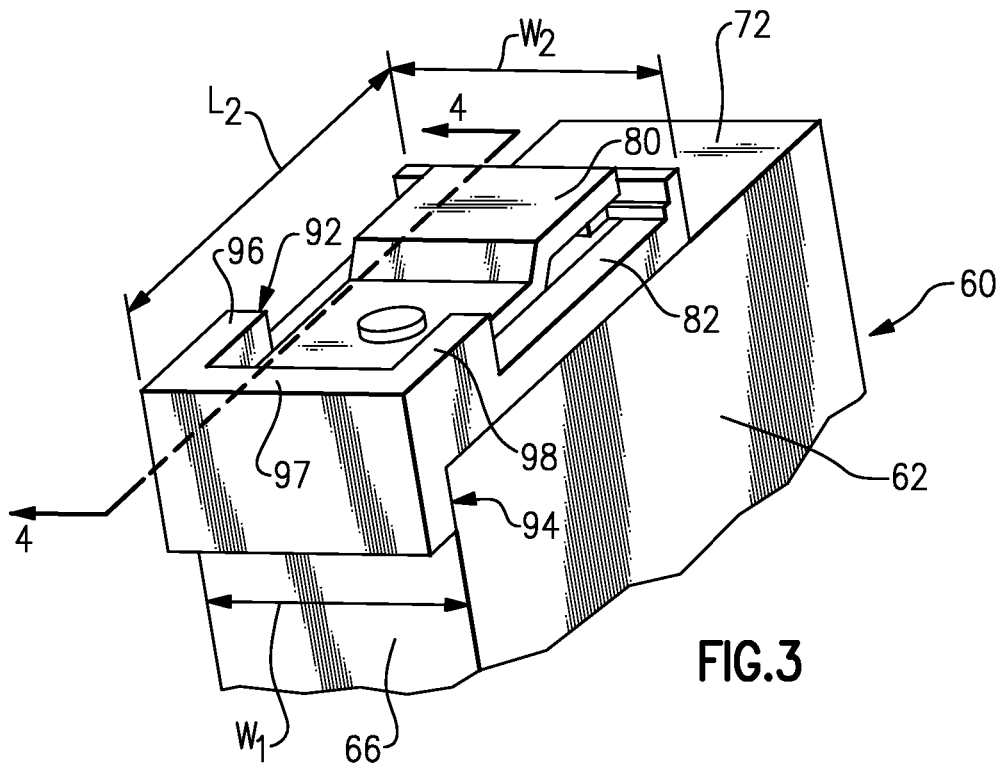
FIG. 3 is a perspective view of an example battery cell, including a terminal holder according to this disclosure, without the rails of FIG. 2.

Referring to FIG. 3, and with continuing reference to FIG. 2, a terminal 80 is secured directly to each current collector 78. The terminal 80 is made of a conductive material, such as a metal, and in some examples is connected to a bus bar to transmit power for use in the powertrain 10.

In this example, a terminal holder 82 is provided between the terminal 80 and the upper surface 72 of the cell 60. The terminal holder 82 is made of a dielectric material, such as plastic, in one example. The terminal holder 82 in some cases is referred to as a "dielectric" or an "under-terminal dielectric." As is known in this art, dielectric materials are electric insulators. This disclosure is not limited to any particular dielectric material. This disclosure also extends to other materials which may not be known as "dielectric" materials, but may have insulative properties.

In this example, the terminal holder 82 has a length $L_2$ and a width $W_2$, each of which are larger than a corresponding length and width of the terminal 80. Thus, in this example, the terminal 80 is provided entirely within a perimeter of the terminal holder 82.

Figure 4:
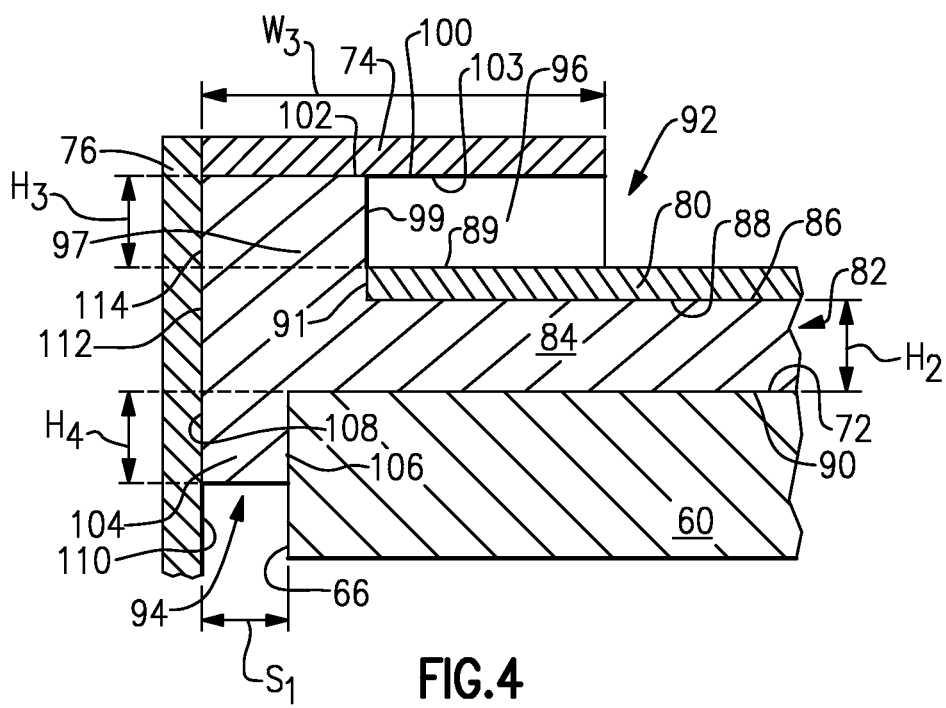
FIG. 4 is a cross-sectional view taken along 4-4 from FIG. 3, with the rails of FIG. 2 included.

With joint reference to FIGS. 3 and 4, the example terminal holder 82 includes a main body portion 84 having a height $H_2$. Note that the rails 74, 76 are shown in FIG. 4, but are excluded from FIG. 3 for purposes of clarity. The main body portion 84 has an upper surface 86, which is in direct contact with a lower surface 88 of the terminal 80. The main body portion 84 further includes a lower surface 90, which is in direct contact with the upper surface 72 of the cell 60. The main body portion 84 electrically insulates the battery cell 60 from the terminal 80. In this example, the height $H_2$ is at least 1.6 millimeters (0.063 inches), which ensures a proper level of insulation.

The illustrated terminal holder 82 further includes an upper rail protection portion 92 and a side rail protection portion 94, each of which extend from the main body portion 84. The upper rail and side rail protection portions 92, 94 are formed integrally with the main body portion 84 in one example. The terminal holder 82 may be injection molded—and thus integrally formed—to provide a seamless, continuous structure. This disclosure is not limited to injection molding, however.

With continued reference to FIGS. 3 and 4, the upper rail protection portion 92 includes a flange having first, second, and third legs 96, 97, 98. As used herein, the term "flange" refers to any projection extending from the main body portion 84. While three legs 96, 97, 98 are illustrated, other arrangements come within the scope of this disclosure.

In the illustrated example, the first leg 96 is arranged such that its length is parallel to the width $W_3$ of the upper rail 74. Further, the first leg 96 is in contact with a side edge of the terminal 80. The second leg 97 has a length perpendicular to the first leg 96, and includes an inner surface 99 in contact with an outer edge 91 of the terminal 80. The third leg 98 is provided on an opposite side of the terminal holder 82 than the first leg 96, and substantially mirrors the first leg 96. The second leg 97 spans between the first and third legs 96, 98, and extends along an outer edge of the terminal holder 82.

The uppermost surfaces of the first, second, and third legs 96, 97, 98 directly contact the upper rail 74 in this example. As illustrated in FIG. 4, uppermost surfaces 100, 102 of the first leg 96 and the second leg 97, respectively, directly contact a lowermost surface 103 of the upper rail 74. In this example, the first, second, and third legs 96, 97, 98 extend a height $H_3$ above the upper surface 89 of the terminal 80. This height $H_3$ ensures that the upper rail protection portion 92 properly insulates the terminal 80 from the upper rail 74. In this example, the height $H_3$ is at least 1.6 millimeters (0.063 inches).

The side rail protection portion 94, in this example, is provided by the portion of the terminal holder 84 that extends beyond (e.g., overhangs) the side 66. In this example the terminal holder extends beyond the side 66 of the cell 60 by a spacing $S_1$.

The side rail protection portion 94 is provided in part by a flange 104, which extends downward, by a distance illustrated as height $H_4$, from a portion of the lower surface 90 of the main body portion 84. Further, the flange 104 has an inner surface 106 that directly contacts the side 66 of the cell 60. The flange 104 also has an outer surface 108, which directly contacts an inner surface 110 of the side rail 76.

The flange 104 has a thickness equal to the spacing $S_1$, which ensures proper insulation between the side rail 76 and the cell 60. In this example, the spacing $S_1$ is at least 1.6 millimeters (0.063 inches). In addition to the flange 104, the side rail 76 is also in direct contact with an outer surface 112 of the main body portion 84, and an outer surface of the second leg 97.

The terminal holder 82 provides proper electrical insulation between the cells 60 and the adjacent structures, reducing the likelihood of a short. Further, the terminal holder 82 eliminates the need for a separate insulating structure, such as a dedicated rail cover, between the cells 60 and the rails 74, 76. Accordingly, the disclosed arrangement reduces manufacturing costs and other complications, such as assembly time, associated with additional components.

It should be understood that terms such as "above," "below," "upward," "downward," "upper," "lower," "inner," and "outer" are used above with reference to the normal orientation of the battery pack 24 and the cells 60 as used within a vehicle during operation. These terms are used for purposes of explanation, and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. An electric vehicle battery assembly, comprising:
   a battery cell;
   a side rail securing the cell and provided adjacent a side of the cell;
   an upper rail securing the cell and provided adjacent an upper surface of the cell; and
   a terminal holder in direct contact with both the side rail and the upper rail.

2. The battery assembly as recited in claim 1, wherein the terminal holder includes a side rail protection portion overhanging the side of the cell.

3. The battery assembly as recited in claim 2, wherein the side rail protection portion includes a flange extending downward from a lower surface of a main body portion of the terminal holder, and wherein the flange of the side rail protection portion directly contacts the side of the cell and the side rail.

4. The battery assembly as recited in claim 3, wherein the flange of the side rail protection portion has a thickness of at least 1.6 mm.

5. The battery assembly as recited in claim 1, wherein the terminal holder includes an upper rail protection portion provided by a flange extending upward from an upper surface of a main body portion of the terminal holder, the upper rail directly contacting the flange of the upper rail protection portion.

6. The battery assembly as recited in claim 5, wherein the flange of the upper rail protection portion includes a first leg, a second leg, and a third leg.

7. The battery assembly as recited in claim 5, further including:
   a terminal in contact with the upper surface of the main body portion of the terminal holder, the flange of the upper rail protection portion extending a height of at least 1.6 mm above an upper surface of the terminal.

8. The battery assembly as recited in claim 5, wherein the main body portion has a height of at least 1.6 mm.

9. The battery assembly as recited in claim 1, wherein the terminal holder is integrally formed of a dielectric material.

10. A terminal holder for an electric vehicle battery assembly, comprising:
    a main body portion having an upper surface and a lower surface; and
    a side rail protection portion including a flange extending downward from the lower surface of the main body portion, wherein the flange of the side rail protection portion is configured to overhang a side of a battery cell.

11. The terminal holder as recited in claim 10, wherein the flange of the side rail protection portion has a thickness of at least 1.6 mm.

12. The terminal holder as recited in claim 10, further including:
    an upper rail protection portion including a flange extending upward from the upper surface of the main body portion.

13. The terminal holder as recited in claim 12, wherein the flange of the upper rail protection portion includes a first leg, a second leg, and a third leg.

14. The terminal holder as recited in claim 12, wherein the main body portion, the side rail protection portion, and the upper rail protection portion are integrally formed.

15. The terminal holder as recited in claim 14, wherein the terminal holder is made of a dielectric material.

16. The terminal holder as recited in claim 11, wherein the main body portion has a height of at least 1.6 mm.

17. An electric vehicle battery assembly, comprising:
a battery cell;
a side rail adjacent a side of the cell;
an upper rail adjacent an upper surface of the cell;
a terminal;
a terminal holder including a main body portion in contact with the terminal, the terminal holder including a side rail protection portion overhanging the side of the cell and directly contacting the side rail, and the terminal holder further including an upper rail protection portion extending upward from the main body portion and directly contacting the upper rail, wherein the upper rail protection portion includes a flange having a first leg, a second leg, and a third leg, wherein an outer surface of the second leg directly contacts the side rail, and wherein an upper surface of the second leg directly contacts the upper rail.

18. The battery assembly as recited in claim 17, wherein the side rail protection portion includes a flange extending downward from a lower surface of the main body portion.

19. The battery assembly as recited in claim 1, wherein an outermost surface of the terminal holder directly contacts the side rail and wherein an uppermost surface of the terminal holder directly contacts the upper rail.

20. The battery assembly as recited in claim 6, wherein an outer surface of the second leg directly contacts the side rail, and wherein an upper surface of the second leg directly contacts the upper rail.

21. The terminal holder as recited in claim 10, wherein an outermost surface of the terminal holder is configured to directly contact a first rail adjacent a side of a battery cell and an uppermost surface of the terminal holder is configured to directly contact a second rail adjacent an upper surface of the battery cell.

22. The terminal holder as recited in claim 13, wherein:
the terminal holder is configured to be provided relative to a battery cell,
an outer surface of the second leg is configured to directly contact a side rail adjacent a side of the cell, and
an upper surface of the second leg is configured to directly contact an upper rail adjacent an upper surface of the cell.

23. The terminal holder as recited in claim 16, further comprising an upper rail protection portion including a flange extending upward from the upper surface of the main body portion, wherein the upper surface of the main body portion is configured to support a terminal, and wherein the flange of the upper rail protection portion is configured to extend a height of at least 1.6 mm above an upper surface of the terminal.

* * * * *